United States Patent
Kim et al.

(10) Patent No.: US 10,988,391 B2
(45) Date of Patent: Apr. 27, 2021

(54) DESALINATION ELECTRODE

(71) Applicant: Robert Bosch GmbH, Stuttgart (DE)

(72) Inventors: Soo Kim, Cambridge, MA (US); Jonathan Mailoa, Cambridge, MA (US); Mordechai Kornbluth, Brighton, MA (US); Georgy Samsonidze, San Francisco, CA (US); Michael Metzger, Sunnyvale, CA (US); Saravanan Kuppan, Sunnyvale, CA (US); Sondra Hellstrom, East Palo Alto, CA (US); Boris Kozinsky, Waban, MA (US); Nathan Craig, Santa Clara, CA (US)

(73) Assignee: ROBERT BOSCH GmbH, Stuttgart (DE)

( * ) Notice: Subject to any disclaimer, the term of this patent is extended or adjusted under 35 U.S.C. 154(b) by 147 days.

(21) Appl. No.: 16/233,512

(22) Filed: Dec. 27, 2018

(65) Prior Publication Data

US 2020/0207646 A1    Jul. 2, 2020

(51) Int. Cl.
  *C02F 1/46* (2006.01)
  *C02F 1/461* (2006.01)
  *H01M 4/62* (2006.01)

(52) U.S. Cl.
  CPC ........ *C02F 1/46109* (2013.01); *C02F 1/4604* (2013.01); *H01M 4/623* (2013.01);
  (Continued)

(58) Field of Classification Search
  CPC ............... C02F 1/46109; C02F 1/4604; C02F 2001/46133; C02F 2201/46115; H01M 4/623; H01M 4/625; Y02E 60/10
  See application file for complete search history.

(56) References Cited

U.S. PATENT DOCUMENTS 8,894,964 B2    11/2014 Ka et al.
2016/0251529 A1*  9/2016 Hasegawa ............ C09D 11/52
                                                           252/511

FOREIGN PATENT DOCUMENTS

WO    2009065023 A1    5/2009

OTHER PUBLICATIONS

Shahin Homaeigohar et al., "Graphene Membranes for Water Desalination," NPG Asia Materials (2017) 9, pp. 1-16.
(Continued)

*Primary Examiner* — Arun S Phasge
(74) *Attorney, Agent, or Firm* — Brooks Kushman P.C.

(57) ABSTRACT

A desalination battery includes a container configured to contain a saline water solution having a first concentration $c_1$ of dissolved salts; first and second intercalation hosts, arranged to be in fluid communication with the saline water solution, at least the first intercalation host including expanded graphite having a plurality of graphene layers with an interlayer spacing between the graphene layers in z-direction greater than 0.34 nm; and a power source configured to supply electric current to the first and second intercalation hosts such that the first and second intercalation hosts reversibly store and release cations and anions from the saline water solution located between the plurality of graphene layers to generate a fresh water solution having a second concentration $c_2$ of dissolved salts and a brine solution having a third concentration $c_3$ of dissolved salts within the container such that $c_3 > c_1 > c_2$.

20 Claims, 3 Drawing Sheets

(52) U.S. Cl.
CPC ... *H01M 4/625* (2013.01); *C02F 2001/46133* (2013.01); *C02F 2201/46115* (2013.01)

(56) References Cited

OTHER PUBLICATIONS

Yuanyue Liu et al., "Origin of low sodium capacity in graphite and generally weak substrate binding of Na and Mg among alkali and alkaline earth metals," PNAS, Apr. 5, 2016, vol. 113, No. 14, pp. 3735-3739.

Yang Wen et al., "Expanded graphite as superior anode for sodium-ion batteries," Nature Communications, 2014, www.nature.com/naturecommunications, pp. 1-10.

Mauro Pasta et al., "A Desalination Battery," American Chemical Society, 2012, Nano Letters, 12, pp. 839-843.

Ji Chen et al., "An improved Hummers method for eco-friendly synthesis of graphene oxide," Elsevier, www.sciencedirect.com, Carbon 64 (2013) pp. 225-229.

William Hummers, Jr. et al., "Preparation of Graphite Oxide," 1958, p. 1339.

Kunimitsu Morishige et al., "Iron Oxide Pillared Graphite," Langmuir 2005, 21, 6277-6281.

Yun-Xiao Wang et al., "Facile synthesis of a interleaved expanded graphite-embedded sulphur nanocomposite as cathode of Li—S batteries with excellent lithium storage performance," J. Mater. Chem., 2012, 22, pp. 4744-4750.

Li-Zhong Bai et al., "A comparative study of electrochemical performance of graphene sheets, expanded graphite and natural graphite as anode materials for lithium-ion batteries," Ectrochimica Acta 107 (2013) pp. 555-561.

Abdalla Alrashdan, "Thermo-mechanical behaviors of the expanded graphite-phase change material matrix used for thermal management of Li-ion battery packs," Journal of Materials Processing Technology 210 (2010) pp. 174-179.

Jiri Klimes et al., "Van der Waals density functionals applied to solids," Physical Review B 83, 195131 (2011) American Physical Society.

Jiri Klimes, "Chemical Accuracy for the van der Waals density functional," Journal of Physics Condensed Matter, Jan. 2010, pp. 1-5.

Jiri Klimes, "Perspective: Advances and Challenges in treating van der Waals dispersion forces in density functional theory," the Journal of Chemical Physics, 137 120901 (2012), pp. 120901-1-120901-12.

\* cited by examiner

DESALINATION ELECTRODE

TECHNICAL FIELD

The disclosure is directed to an electrode of a water desalination device, and in some embodiments, a desalination battery, the device itself, and a method of producing the same.

BACKGROUND

There is an ever-growing need for quality drinking water. Yet, sources of fresh water on land are limited, some are being depleted, and water quality of other sources is being compromised by a plethora of industrial and agricultural processes as well as expansion of cities. Thus, technologies are being developed to obtain fresh water from an abundant water source—sea and ocean water. But sea or saline water contains high concentrations of dissolved salt which renders the water unsuitable for human consumption, agricultural use, or industrial processes. Thus, the saline water requires desalination to lower its concentration of dissolved solids before it can be utilized as drinking or industrial water.

Efforts to desalinate water date back thousands of years. For example, first recorded attempts include evaporation of salt water conducted by sailors at sea. The first large-scale modern desalination process, a multi-stage flesh distillation was developed during mid-$20^{th}$ century. Since then, various different desalination processes have been proposed and tested. Yet, common problems associated with these processes, which prevent a more widespread use of desalination, include high energy demands, environmental concerns, material issues related to corrosion of membranes, etc.

SUMMARY

In at least one embodiment, a desalination battery is disclosed. The battery includes a container configured to contain a saline water solution having a first concentration $c_1$ of dissolved salts. The battery also includes first and second intercalation hosts, arranged to be in fluid communication with the saline water solution, at least the first intercalation host including expanded graphite having a plurality of graphene layers with an interlayer spacing greater than 0.34 nm. The battery includes a power source configured to supply electric current to the first and second intercalation hosts such that the first and second intercalation hosts reversibly store and release cations and anions from the saline water solution located between the plurality of graphene layers to generate a fresh water solution having a second concentration $c_2$ of dissolved salts and a brine solution having a third concentration $c_3$ of dissolved salts within the container such that $c_3 > c_1 > c_2$. The interlayer spacing between the plurality of graphene layers may be significantly uniform. The interlayer spacing between the graphene layers in z-direction may be between about 0.37 nm and 0.45 nm. The power source may be configured to operate between about −0.5 and 1.5 V. The battery may further include a saline water inlet and a fresh water outlet. Both the first and second intercalation hosts may include expanded graphite having a plurality of graphene layers with an interlayer spacing greater than 0.34 nm. The second intercalation host may include alkali metal oxide. At least the first intercalation host may include about 60 to 95 wt. % expanded graphite, about 1 to 20 wt. % conductivity agent(s), and about 1 to 20 wt. % polymeric binder(s), based on the total weight of the first intercalation host.

In another embodiment, a desalination intercalation electrode for use with a desalination battery is disclosed. The electrode may include about 60 to 95 wt. % expanded graphite, about 1 to 20 wt. % conductivity agent(s), and about 1 to 20 wt. % polymeric binder(s), based on the total weight of the desalination intercalation electrode. The expanded graphite may include a plurality of graphene layers with an interlayer spacing between the graphene layers in z-direction greater than 0.34 nm. The interlayer spacing between the plurality of graphene layers may be significantly uniform. The interlayer spacing may be greater than 0.34 nm. The polymeric binder may include polyvinylidene fluoride. The conductivity agent may include carbon black.

In yet another embodiment, a desalination intercalation host is disclosed. The intercalation host may include expanded graphite including a plurality of graphene layers with an interlayer spacing $d_s$ between the graphene layers in z-direction greater than 0.34 nm, one or more pillaring agents, each incorporated between adjacent graphene layers within the expanded graphite and configured to maintain the interlayer spacing $d_s$ between the adjacent layers, one or more conductivity agents, and one or more polymeric binders. The one or more pillaring agents may include sulfur. The one or more pillaring agents may include one or more metal oxides. The one or more pillaring agents may include one or more oxygen functional groups. The interlayer spacing $d_s$ may be between about 0.37 nm and 0.45 nm. The one or more pillaring agents may be chemically bonded to the graphene layers.

DETAILED DESCRIPTION

Figure 1:
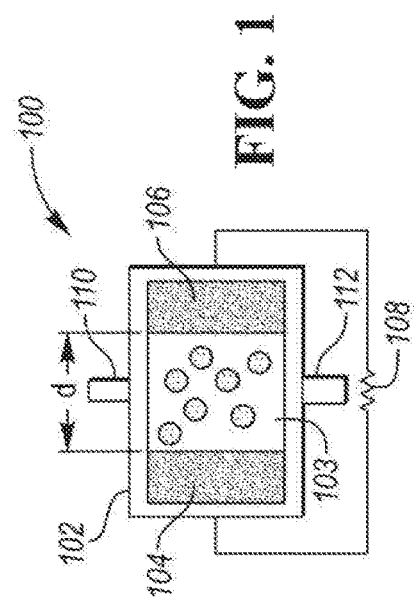
FIG. 1 depicts a schematic diagram of the desalination battery according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The Earth's increasing population has an ever-growing need for clean fresh water for consumption, agricultural, and industrial purposes. Fresh water refers to a water solution having a low salt concentration—usually less than 1%. With the fresh water sources being limited, numerous attempts have been made to produce fresh water from abundant sea and ocean waters by desalination. Desalination is a process of removing mineral components from saline water. Removal of salt and other chemicals from the saline water requires electric or thermal energy to separate the saline water into two streams, a fresh water stream containing a low concentration of dissolved salts and a second stream of concentrated brine.

A variety of desalination technologies have been developed, for example evaporation, freezing, distillation, reverse osmosis, ion exchange, electrodialysis, and the like. Yet, all of these technologies have certain drawbacks that prevent their wide-spread use and limit their success. For example, reverse osmosis typically requires a large input of electrical energy, which makes this technology quite expensive. Additionally, reverse osmosis utilizes selective membranes which are susceptible to fouling or an unwanted accumulation of mineral deposits on the membrane surfaces. The membranes thus need frequent replacement which contributes to maintenance demands and increased cost.

Electrodialysis is another membrane desalination technology implementing ion exchange membranes. Electrodialysis may be costly and does not have a barrier effect against micro bacterial contamination. Membrane-free technologies present other challenges. For example, freeze-thaw typically relies on extended periods of natural sub-zero temperatures and may thus be limited to certain climatic conditions. Multi-effect distillation utilizes several stages or effects during which feed water is heated by steam in tubes onto which saline water is being sprayed. Yet, this technology presents high operating costs unless waste heat is available for the desalination process and high temperatures may increase corrosion and scale formation.

Among the newly developed concepts are electrochemical approaches to desalination such as a desalination battery. Desalination batteries use an electric energy input to extract sodium and chloride ions, as well as other impurity ions from saline water to generate fresh water. The battery thus presents dual-ion electrochemical deionization technology, including sodium and chloride dual-ion electrochemical electrodes to which voltage is applied to bring about separation of saline water into fresh water having a relatively low concentration of dissolved salts and a concentrated brine stream. For cation collection such as $Na^+$, $Mg^{2+}$, $Ca^{2+}$, $K^+$, $Pb^{2+}$, and the like, the intercalation or conversion reaction in the cathode part of the desalination battery typically occurs in binary, ternary, or higher oxides and/or cyanides such as $MnO_2$, $Na_{0.44}MnO_2$, $KFeCu(CN)_6 \cdot xH_2O$, sodium nickel- and/or sodium iron-based hexacyanoferrates (HCF) as the working electrode system. The anion removal of $Cl^-$, $SO_4^{2-}$, etc. typically takes place in a very expensive Ag/AgCl electrode system.

Thus, it would be desirable to develop a working dual-ion electrochemical electrodes which are durable, cost-effective, and scalable to industrial production.

A desalination battery disclosed herein solves one or more problems described above and/or provides the benefits identified herein. A non-limiting example of a desalination battery is depicted in FIG. 1. According to one or more embodiments, the desalination battery 100 includes a container 102 to retain a liquid solution 103 such as saline water or fresh water, two electrodes 104 and 106, a power source 108, a saline water inlet 110, and a fresh water outlet 112. Additional components such as additional inlets, outlets, and the like are contemplated. Two electrodes 104 and 106 may be separated by the presence of exchange membrane. The exchange membrane may be either anion or cation exchange membrane. The exchange membrane may include a separator on either or both sides.

The container 102 may be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, contaminated water, industrial water, etc. The container 102 is spacious enough to house a sufficient amount of a water solution undergoing desalination; dimensions thus differ based on a specific application. The container 102 may be large enough to serve industrial applications. The container 102 may be made from different materials capable of withstanding corrosion, temperature fluctuations, changing pH, varying pressure, and be resistant to other chemical, mechanical, and/or physical conditions.

The container 102 may be made me from glass, plastic, composite, metal, ceramic, or a combination of materials. The container 102 may feature one or more protective coatings. The container 102 may be made from a material which will minimize occurrence of water contamination. The container 102 may be made from material(s) which are nontoxic and comply with drinking water standards.

The container 102 may feature one or more inlets and outlets. For example, the container 102 may have a saline water inlet 110 and a fresh water outlet 112. The inlet 110 may be connected to a saline water reservoir, and the fresh water outlet 112 may be connected to a fresh water reservoir. Additional inlets and outlets may be included. For example, a separate outlet for a brine stream may be included. Alternatively, the saline water inlet 110 may also serve as a brine stream outlet. In each inlet and outlets, manual or controlled valves may help control the water flow into the device 100.

The battery 100 includes a set of electrodes 104 and 106. The electrodes are arranged within the battery 100 to be in fluid communication with the water present in the container 102. The electrodes 104 and 106 are at least partially submerged in the water solution. The electrodes 104 and 106 may be fully submerged in the water solution. While in FIG. 1, the electrodes 104 and 106 are depicted on the opposite sides of the container 102, the electrodes 104 and 106 may be arranged differently within the container 102. For example, the electrodes 104, 106 may be located centrally within the container 102, or both may be located on the same side of the container 102. The electrodes 104, 106 may be located next to each other or be separated by a distance d with the presence of separator(s) and exchange membrane (either anion exchange membrane or cation exchange membrane). The distance d may be 1 mm or more, 1 cm or more, 10 cm or more, 20 cm or more, 30 cm or more, depending on the dimensions of the battery module and stack systems, container 102, and electrodes 104, 106.

The electrodes 104 and 106 may be made from the same or different material, depending on the operating condition and device design. For example, the battery 100 may feature a symmetric electrode configuration, where both the first 104 and second electrodes 106 are made from the same material. Alternatively, the battery 100 may feature an asymmetric electrode configuration such that a first electrode 104 is made at least partially or entirely from a different material than the second electrode 106. The electrode materials may share similar structural characteristics (e.g., same space group), but the concentration of ions (e.g., $Na^+$) may differ.

At least the first electrode 104 is made from expanded graphite. Graphite is a crystalline allotrope of carbon and is an example of a semimetal. Graphite presents the most stable form of carbon under standard conditions. Graphite is an electric conductor with highly anisotropic acoustic and thermal properties and is self-lubricating. Graphite has a layered, planar structure. Graphite's individual layers are called graphene. In each layer, the carbon atoms are configured in a honeycomb lattice with natural separation of 0.142 nm. The interlayer distance of pristine graphite is 0.335 or 0.34 nm. Individual atoms in the plane are bonded covalently, but bonding between graphene layers is provided via weak van der Waals bonds.

Thanks to its unique properties and structure, graphite has been used as an anode electrode material in Li-ion batteries. Yet, the applications typically involve pristine graphite. It is well-known that pristine graphite with its interlayer distance between the graphene layers in z-direction of 0.34 nm is not suitable for a different type of batteries, namely Na-ion batteries (NIB) because pristine graphite has a low capacity for $Na^+$ ions. Due to the relatively large size of $Na^+$ ions and steric effects, $Na^+$ generally has a weaker chemical bonding to pristine graphite than other elements present in the same column of the periodic table, that is other alkali metals. For example, $Na^+$ ions have larger radius than $Li^+$, which may hinder mass transport of $Na^+$ ions during electrochemical processes. For example, an experimental electrode made from pristine graphite may be cycled with a current density of 10 mA/g in NIB configuration resulting in only negligible sodium storage capacity of ~13 mAh/g. Thus, pristine graphite has been identified as relatively incompatible for applications including $Na^+$ ions.

Figure 2:
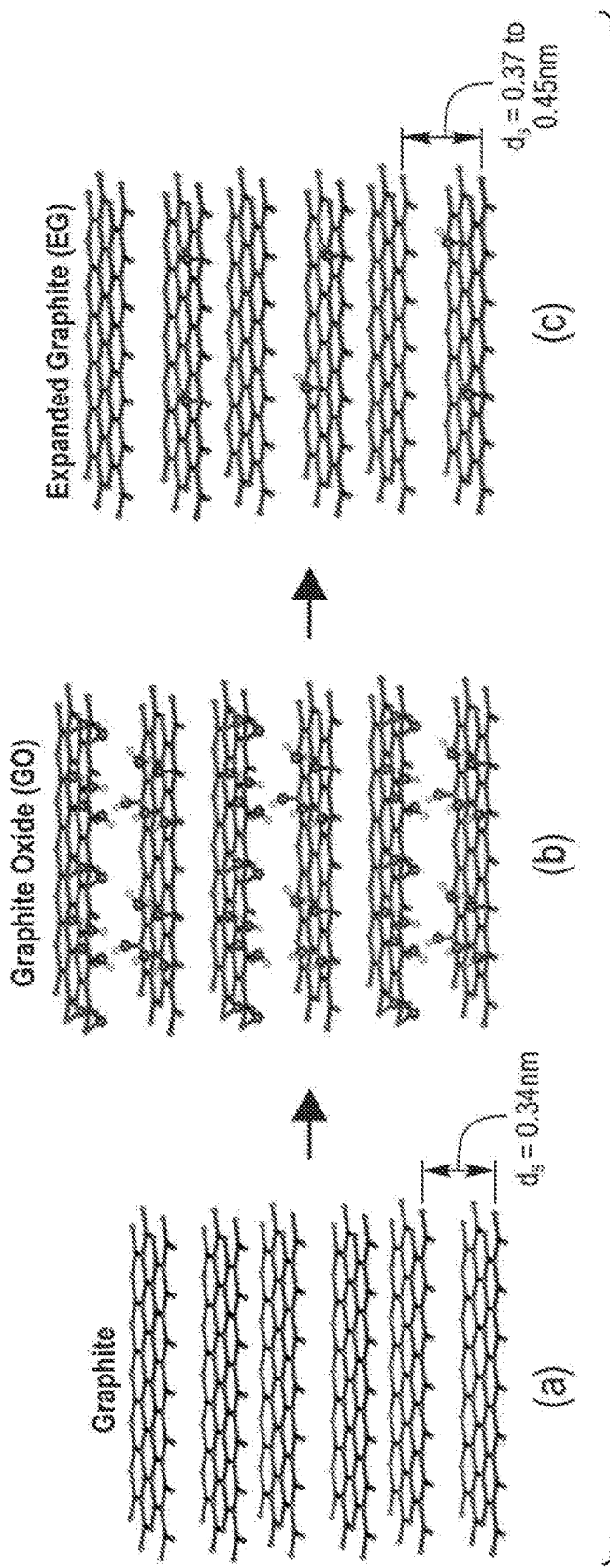
FIG. 2 shows a comparison of pristine graphene, graphite oxide, and expanded graphite with different interlayer spacing distances.

In contrast, the herein disclosed electrode includes expanded graphite. Expanded graphite may be formed by modifying and/or expanding the interlayer distance of the graphene layers. Comparison of the interlayer spacing distance between the graphene layers in z-direction of pristine graphite and expanded graphite is schematically depicted in FIG. 2. The modification may be provided by several different methods, examples of which are described below. Different methods of expansion may result in an interlayer distance tailored for a specific application. When the graphene layers are expanded such that the expanded graphite interlayer distance is greater than 0.34 nm, specifically to 0.43 nm or more, $Na^+$ ions, and/or other ions, may reversibly insert into and extract from the expanded graphite, delivering a relatively high reversible capacity of >~280 mAh/g at the same test current density as the ~13 mAh/g mentioned above. By using expanded graphite instead of pristine graphite, the sodium ion storage capacity may thus improve at least about 20 to 30 times.

The interlayer distance of the graphene layers may be tailored to provide sufficient storage capacity for a variety of anions, cations, or both. The interlayer spacing between the graphene layers may be significantly or substantially uniform. The interlayer spacing may be uniform along the entire length of the graphene layers, if well-controlled by the synthesis conditions.

The interlayer distance $d_s$ between the graphene layers in z-direction in the herein-disclosed expanded graphite may be greater than about 0.34 nm, 0.35 nm, 0.36 nm, 0.37 nm, 0.38 nm, 0.39 nm, 0.40 nm, 0.41 nm, 0.42 nm 0.43 nm, 0.44 nm, 0.45 nm, 0.46 nm, 0.47 nm, 0.48 nm, 0.49 nm, 0.50 nm, 0.51 nm, 0.52 nm, 0.53 nm, 0.54 nm, 0.55 nm, 0.56 nm, 0.57 nm, 0.58 nm, 0.60 nm, 0.61 nm, 0.62 nm, 0.63 nm, 0.64 nm, 0.65 nm, 0.66 nm, 0.67 nm, 0.68 nm, 0.69 nm, 0.70 nm or greater. The interlayer distance $d_s$ of the expanded graphite may be between about 0.37 and 0.45 nm, about 0.45 nm and 0.6 nm. The interlayer distance $d_s$ of the expanded graphite may be from about 0.37 to about 0.7 nm, about 0.43 to about 0.6 nm, or about 0.45 to about 0.55 nm. Different oxygen functional groups in the graphene sheets may assist with controlling the interlayer distance $d_s$. The oxygen functional groups may include groups such as —OH, =O, —O—, —COOH, the like, or a combination thereof. The groups may be prepared via solution-based approach and/or heat-treatment that may precisely control the interlayer distance $d_s$.

As a result of the expanded interlayer distance, expanded graphite can uptake cations and anions from saline water, seawater, brackish water, or the like. Expanded graphite can uptake cations including, but not limited to $Na^+$, $Mg^{2+}$, $Al^{3+}$, $Si^{4+}$, $K^+$, $Ca^+$, $Sc^{3+}$, $Ti^{4+}$, $V^{2+/3+/4+}$, $Ca^{3+/6+}$, $Mn^{2+/3+/4+}$, $Fe^{2+/3+}$, $Ni^{2+/3+/4+}$, $Cu^{2+}$, $Zn^{2+}$, $Sn^{2+/4+}$, $Pb^{4+}$, etc. and anions including, but not limited to $F^-$, $Cl^-$, $Br^-$, $I^-$, $S^{-2}$, $ClO_4^-$, $ClO_3^-$, $ClO_2^-$, $BrO_3^-$, $SO_4^{2-}$, $SiO_3^{2-}$, $CN^-$, and the like.

The electrodes 104, 106 of the battery 100 thus function as intercalation hosts. Intercalation refers to reversible inclusion of one or more ions into materials with layered structures. The spaces between layers of expanded graphite may serve as a temporary storage for one or more types of ions. The expanded interlayer distance of the expanded graphite thus allows even ions with a relatively large radius such as $Na^+$ to be drawn within the spaces defined by the graphene layers, temporarily remain therein, and be released later. The expanded graphite thus hosts one or more ions as guests.

The electrodes 104, 106 may operate within the water stability window, approximately −0.5 to 1.5 V, −0.3 to 1.2 V, or 0 to 0.9 V in comparison to standard hydrogen electrode (SHE) to store one or more of the above-mentioned types of ions. The actual capacity of ions in the expanded graphite electrodes 104, 106 may vary depending on the operating voltage conditions, concentration of ions present in the water solution, overall chemical composition of the water solution, acidity of the water solution, and ohmic or any other type of resistance within the battery device, etc. For example, the actual capacity of ions in the electrodes 104, 106 would differ based on location as seawaters in different parts of the world have varying ion concentrations.

The battery 100 further contains a power source, current source, or voltage source 108 capable of supplying electric current to the electrodes 104, 106. The electric current may be constant current. The electric current is being applied to remove various ions from the water contained in the container 102.

Figure 3:
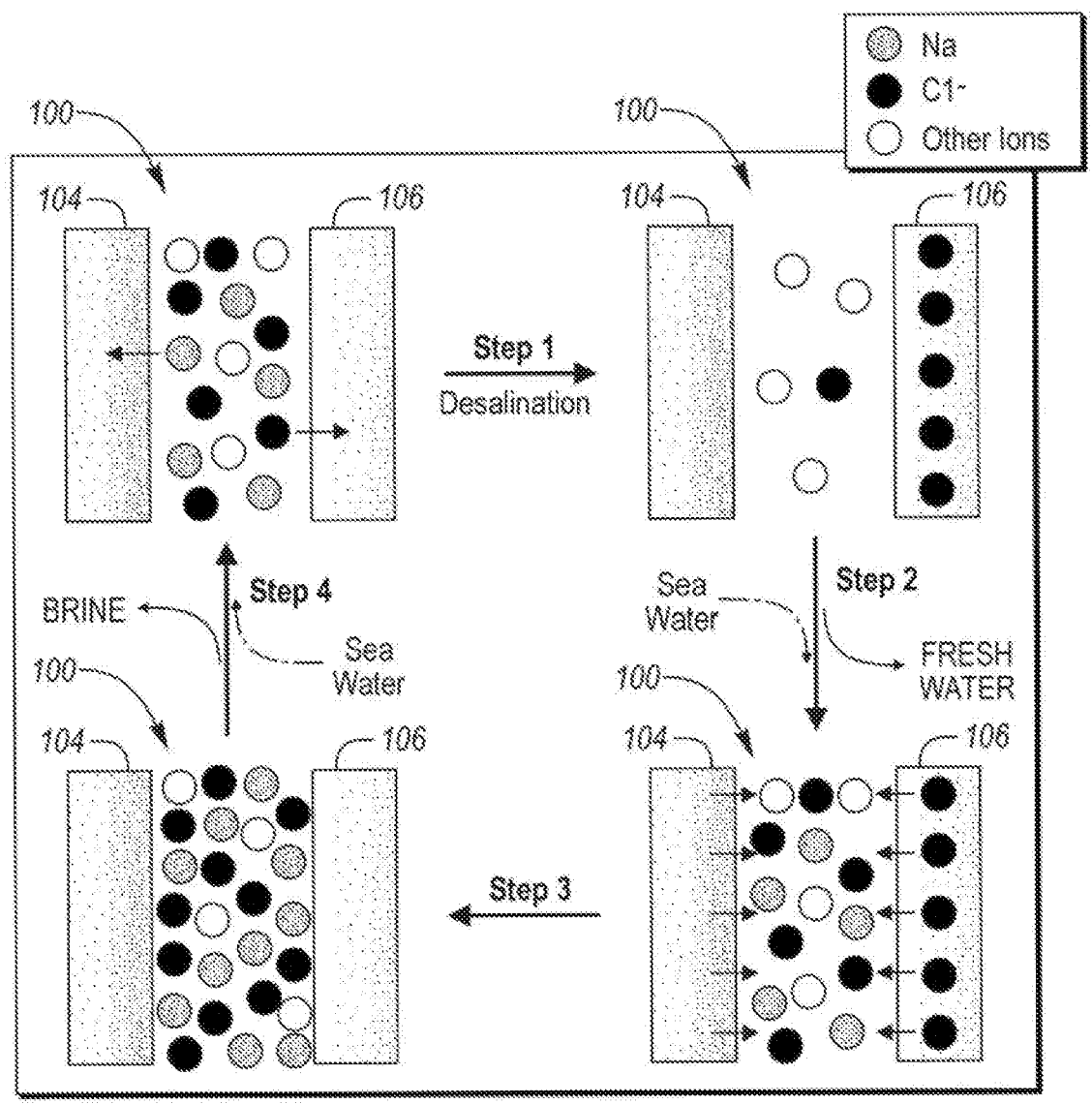
FIG. 3 schematically shows a four-step desalination process utilizing a battery of one or more embodiments.

FIG. 3 schematically illustrates a four-step charge/discharge desalination process of the desalination battery 100 disclosed herein. In step one, constant current is being applied to the battery 100 to remove various ions mentioned herein from a water solution present in the container 102. The water solution may be saline, sea water, salt water, brackish water having a first concentration $c_1$ of dissolved salts. $c_1$ represents a concentration which is greater than a concentration of dissolves salts in a solution acceptable for drinking, agricultural, or industrial purposes. The saline water solution may be brought to the container via a saline water inlet 110, for example from a saline water reservoir. During the first step, ions move from the saline water solution into the interlayer spaces of the expanded graphite as guests of the intercalation hosts or electrodes 104, 106. As the ions move from the saline water solution into the electrodes 104, 106, the concentration of dissolved salt in the saline water solution is being lowered until it reaches $c_2$, which is lower than $c_1$. $c_2$ represents a concentration of dissolves salts within a solution acceptable for drinking, agricultural, or industrial purposes. At the end of step one, a substantial amount of ions have been released from the saline water solution into the storage spaces between the graphene layers of the expanded graphite such that the water solution may be characterized as a fresh water solution having a second concentration $c_2$ of dissolved salts.

In step two, the fresh water solution present in the container 102 is withdrawn, for example via a fresh water outlet into a fresh water reservoir. The pH of fresh water may be checked and further neutralized as needed. The amount of withdrawn fresh water solution is replaced with new saline water solution, for example via the saline water inlet 110.

In step three, the intercalation hosts 104, 106 are recharged in the new saline water solution. The intercalation hosts 104, 106 release the temporarily-stored ions into the solution, thus increasing concentration $c_3$ of dissolves salts of the solution, creating a brine solution having a concentration $c_3$ of dissolved salts such that $c_3 > c_1 > c_2$.

In the fourth step, the brine solution is released, for example via a brine outlet or the saline water inlet 110. In step four, a new saline water solution replaces the brine solution in the container 102, and the battery 100 may undergo another cycle of reducing concentration of dissolved salt in a water solution in steps one and two and recharging the intercalation hosts 104, 106 in steps three and four.

As was stated above, the battery 100 may be symmetrical with respect to the electrodes such that both electrodes 104, 106 include expanded graphite as an active material. Alternatively, the battery 100 may include a first electrode 104 including expanded graphite while the second electrode 106 may include an alternative active material such as alkali metal oxide(s) such as $Na_xMO_y$, or other oxides. Additionally, both electrodes 104, 106 may include expanded graphite in the same or different loading levels. An example loading amount of the active material may be about 0.01 to 100 mg/cm², 0.05 to 50 mg/cm², or 0.1 to 10 mg/cm².

Besides the active material, one of the electrodes 104, 106, or both may include one or more conductivity agents, one or more polymeric binders, and/or other components. The electrode(s) 104, 106 may include active material such as expanded graphite in the amount of about 70 to 99 wt. %, 75 to 97 wt. %, or 60 to 95 wt. %, based on the total weight of the electrode. The electrode(s) 104, 106 may include active material such as expanded graphite in the amount of about 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt. %, based on the total weight of the electrode. The electrode(s) 104, 106 may include one or more conductivity agents in the amount of about 1 to 40 wt. %, 2.5 to 30 wt. %, or 5 to 20 wt. %, based on the total weight of the electrode. The electrode(s) 104, 106 may include one or more polymeric binders in the amount of about 1 to 30 wt. %, 2.5 to 20 wt. %, or 5 to 15 wt. %. The electrode(s) 104, 106 may include one or more conductivity agents, polymeric binders, and/or other component(s) in the amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt. %, based on the total weight of the electrode.

A non-limiting example of a conductivity agent may include carbon black, conductive carbon black, amorphous carbon, carbon fibers, quaternary ammonium salt(s), alkyl sulfonate(s), halogen-free cationic compound(s), the like, or a combination thereof.

A non-limiting example of a polymeric binder may be polyvinylidene fluoride (PVdF), polyacrylonitrile (PAN), poly(methyl methacrylate) (PMMA), polyethylene glycol (PEO), polyimide, polydopamine, poly(ethylene glycol)diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlorotrifluoroethylene) (PVdF-CTFE), poly(methyl methacrylate-vinyl acetate) (PMMA-VAc), poly(ethylene glycol)diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG), the like, or a combination thereof.

Additionally, the electrode(s) 104, 106 may include one or more pillaring agents. Pillaring agents or dopants refer to various compounds which may be incorporated within the structure of the expanded graphite by chemical modification of the expanded graphite. For example, the pillaring agents may be chemically and/or mechanically bonded to the individual graphene layers of the expanded graphite. The one or more pillaring agents may be incorporated between adjacent graphene layers within the expanded graphite and/or configured to maintain a predetermined, specific interlayer spacing distance $d_s$ between the adjacent layers.

Figure 4:
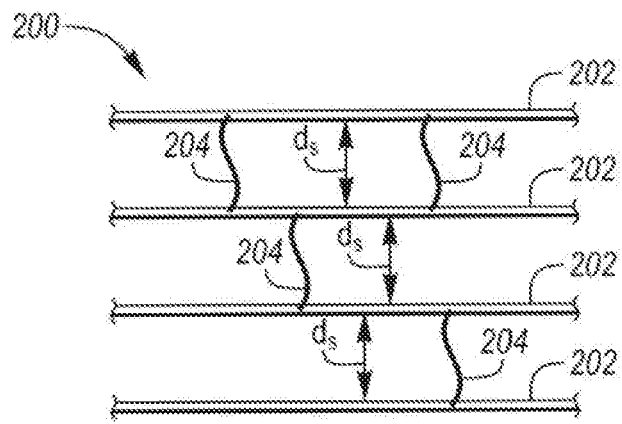
FIG. 4 shows a schematic depiction of a pillared expanded graphite.

A schematic depiction of an expanded graphite with pillaring agents incorporated in the interlayer storage space is depicted in FIG. 4. As can be seen in FIG. 4, expanded graphite 200 has individual layers of graphene 202 separated by a distance $d_s$, depending on the population of oxygen functional groups present in the system. The interlayer distance $d_s$, may be maintained kinetically even if these oxygen functional groups are reduced during the heat treatment. It may be possible for expanded graphite interlayer distance to change over time, depending on the local environment, the ionic species in the water, salt concentration, pH, variable process conditions, and so on. In addition to the graphene layers 202, a number of pillaring agents 204 are incorporated in the structure 200. The pillaring agents 204 are only schematically depicted. The pillaring agents 204 may be evenly, regularly, or irregularly distributed throughout the expanded graphite structure 200. For example, a space between adjacent first and second graphene layers 202 may include the same or a different amount of pillaring agents 204 as a space between a third and fourth adjacent graphene layers 202. For example, the outer layers of the expanded graphite structure 200 may include greater or lesser amount of pillaring agents 204 than inner layers of the expanded graphite 200.

The pillaring agents may further enhance the mass transport and/or selectivity of ion adsorption and desorption processes in the battery 100. For example, incorporating sulfur as a pillaring agent may result in attracting a larger proportion of cations. Alternatively, modifying the expanded graphite with positive metal or metal oxides may result in an increased attraction of anions while repelling cations. The pillaring agents may thus assist with adjusting chemistry of the fresh water solution to achieve a desirable chemical composition of drinking water. For example, in a region where the seawater to be desalinated contains an undesirable amount of anions and/or desirable amount of cations, a positive pillaring agent may be incorporated to attract the anions to be intercalated while leaving a greater amount of cations in the water solution. The fresh water solution may thus be tailored to the local needs and drinking water norms.

In one or more embodiments, a method of producing the intercalation host(s) 104, 106 is disclosed. The active material of expanded graphite may be prepared by reducing graphene oxide. Graphene oxide may be prepared by a Hummer's method by mixing pristine graphite and $NaNO_3$ in $H_2SO_4$ at relatively low temperatures of about 2° C. to 10° C., 3° C. to 7° C., or 5° C. to 6° C. to form a suspension. $KMnO_4$ may be added to the suspension. After continued stirring and dilution with water, the mixture may be heated to up to about 100° C. to 120° C. and treated with $H_2O_2$. The resulting powder may be rinsed with HCl and deionized water.

Graphene oxide may be further reduced to prepare the expanded graphite by heat treatment in the presence of a reducing agent. The reducing agent may be a noble gas such as He, Ar, Ne, Xe, Kr, Ra, or $N_2$ gas, or the like. The preparation is conducted at relatively high temperatures of about 400° C. to 800° C., 500° C. to 700° C., or 550° C. to 600° C. Different heat treatment duration between 1 to 10, 2 to 9 hours, or 3 to 7 hours may be adopted to control the degree of graphene oxide. In the resulting expanded graphite, some unreduced —OH groups may be present.

The method is schematically shown in FIG. 2. As can be observed from FIG. 2, pristine graphite at (a) is reduced to graphite oxide at (b), which is further reduced to expanded graphite at (c). The expanded graphite provides greater interlayer spacing distance ds than pristine graphite.

In a different embodiment, a method of preparing a pillared expanded graphite by dispersing graphite oxide(s) in deionized water and mixing the same with metal precursor (s) in either nitrate, chloride, sulfate, hydroxide, carbonate, or oxalate form is disclosed. The oxalate form may include $M(NO_3)_x$, $MCl_x$, $M(SO_4)_x$, $M(OH)_x$, $M(CO_3)_x$, $M(C_2O_4)_x$, the like, or a combination thereof. The method may include subsequent stirring and drying.

An example anion-doped expanded graphite may be prepared by mixing different weight ratio of sulfur and carbon in a sealed container. The method may further include a secondary heat treatment, where the reaction temperature may be from about 50° C. to 400° C., 100° C. to 300° C., or 150° C. to 200° C. for about 12 to 48 hours, depending on the batch size.

The method may also include mixing the expanded graphite and/or pillared expanded graphite with other components such as one or more conductivity agents and one or more polymeric binders and forming the intercalation host or electrode(s) 104, 106. The method includes preparing the container 102 and securing the intercalation host(s) 104, 106 within the container 102. The method may include providing a voltage, current, or power source 108. The method may include assembling the battery 100 by securing the electrode (s) 104, 106 to the container 102 and connecting the electrode(s) 104, 106 to the power source 108.

The method may further include desalinating a water solution in the battery by filling the container 102 at least partially with a saline water solution having a first concentration $c_1$ of dissolved salts. The method may include supplying the battery 100 with electric current during the desalination process. The method may include bringing the electrode(s) 104, 106 in contact with the saline water solution. The method may include drawing ions from the saline water solution to the intercalation host(s) 104, 106, specifically into the interlayer storage space of the intercalation host(s) 104, 106 such that the saline water solution's concentration of dissolved salts is lowered to $c_2$, $c_1 > c_2$. The method may include removing, drawing out, or flushing the water solution having concentration of dissolved salts $c_2$ as fresh water out of the container 102. The impurity and pH levels of water can be monitored, and further neutralization may be carried out as necessary. The method may include removing the fresh water solution via the fresh water outlet 112 into a fresh water reservoir or elsewhere.

The method may further include providing additional amount of saline water solution having concentration $c_1$ of dissolved salts into the container. The additional amount of saline water may be equal, lower, or greater than the amount of fresh water removed from the container 102. The additional amount of water may be ¼, ½, ⅓, ⅔, 3/2, 5/4, or the like of the amount of saline water solution previously introduced into the container 102 to either (1) minimize the amount of brine water to be released as waste or (2) produce a less-concentrated brine stream. The amount will depend on the desirable or tolerable concentration of dissolved salts of the brine solution to be produced. The method may further include forming a brine solution having concentration $c_3$ of dissolved salts by releasing the stored ions from the intercalation hosts 104, 106 into the saline water solution. The formed brine's concentration of dissolved salts is substantially higher than concentration of dissolved salts in the saline solution and the fresh water solution such that $c_3 > c_1 > c_2$.

The method may also include flushing out the brine solution from the container 102. The brine solution may be removed from the container 102 via the saline water inlet 110 into a saline water reservoir, a brine reservoir, or elsewhere. Alternatively, the brine solution may be removed from the container 102 via a dedicated outlet capable of removing the brine into a specific location while avoiding release of the brine into a natural source of sea water, thus avoiding negative environmental impact associated with disposal of highly concentrated salt solutions onto the sea or ocean floor.

EXAMPLES

Examples 1-3

Figure 5:
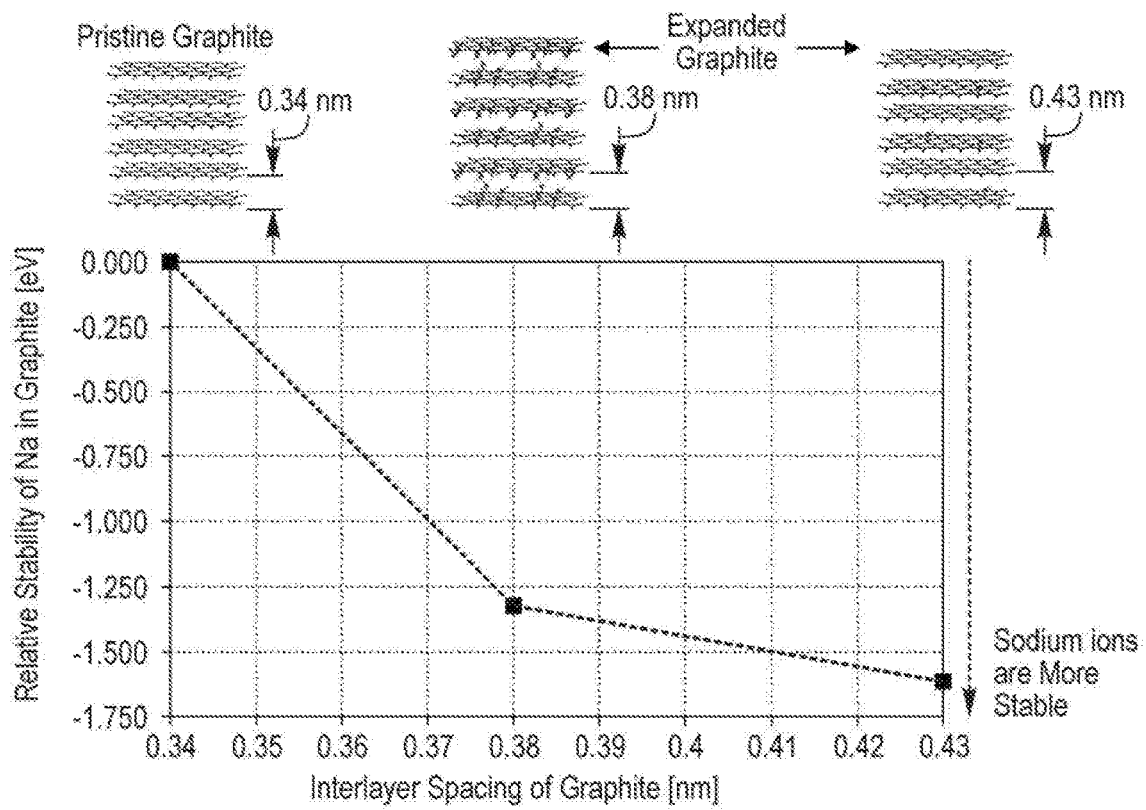
FIG. 5 shows a plot of relative stability of sodium ions in graphite depending on interlayer spacing of graphite.

Examples 1-3 were assessed using first-principles density functional theory (DFT) calculation with Van der Waals corrections according to Klimes et al., *J. Chem. Phys.* 2012, 137, 120901; *J. Phys. Condens. Matter* 2010, 22, 022201; and *Phys. Rev. B* 2011, 83, 195131. Example 1 represents pristine graphite with interlayer spacing distance ds between the graphene layers in z-direction of 0.34 nm, Example 2 represents expanded graphite with interlayer spacing distance ds between the graphene layers in z-direction of 0.38 nm, and Example 3 represents expanded graphite with interlayer spacing distance ds between the graphene layers in z-direction of 0.43 nm. The assessment focused on determination of thermodynamic energetic stability of Examples 1-3. Results of the assessment are shown in FIG. 5.

Figure 6:
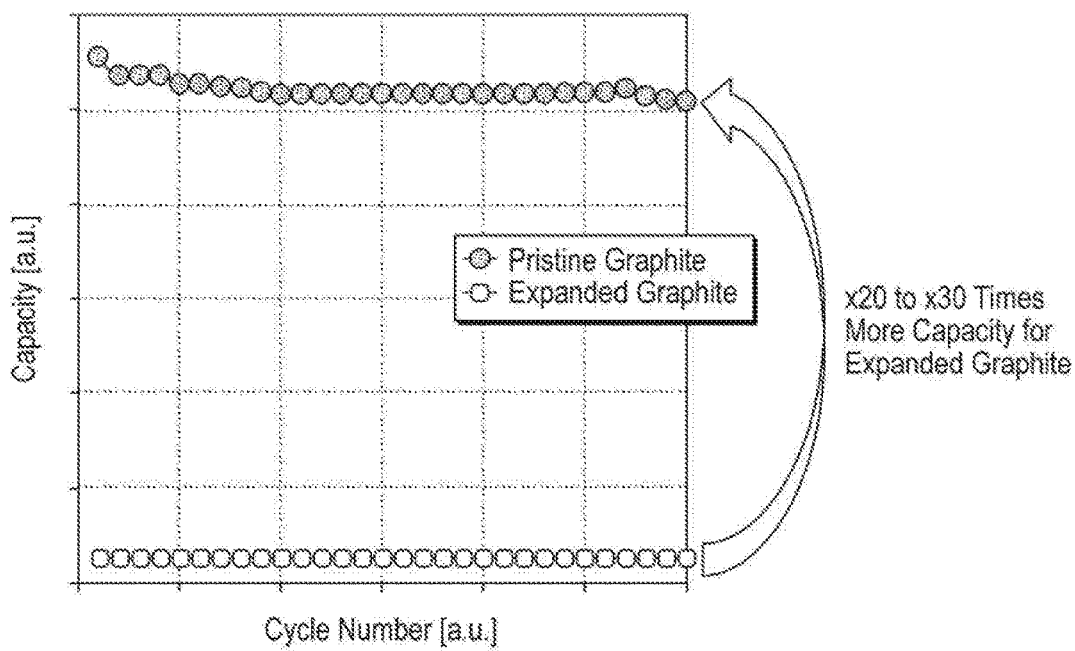
FIG. 6 shows a plot of cycling stability for (de-)sodiation capacity in pristine graphite and expanded graphite.

Examples 1 and 3 were further assessed with respect to expected cycling stability for (de-)sodiation capacity. Results of the assessment are shown in FIG. 6. As can be seen from FIG. 6, at least 20 to 30 times more ions may be stored in the expanded graphite of Example 3 compared to the pristine graphite of Example 1 that cannot store sodium due to the electronic repulsion of $Na^+$ between the unmodified interlayer distances of pristine graphite.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A desalination battery comprising:
    a container configured to contain a saline water solution having a first concentration $c_1$ of dissolved salts;
    first and second intercalation hosts, arranged to be in fluid communication with the saline water solution, at least the first intercalation host including expanded graphite having a plurality of graphene layers with an interlayer spacing between the graphene layers in z-direction greater than 0.34 nm, one or more pillaring agents, one or more conductivity agents, and one or more polymeric binders; and
    a power source configured to supply electric current to the first and second intercalation hosts such that the first and second intercalation hosts reversibly store and release cations and anions from the saline water solution located between the plurality of graphene layers to generate a fresh water solution having a second concentration $c_2$ of dissolved salts and a brine solution having a third concentration $c_3$ of dissolved salts within the container such that $c_3 > c_1 > c_2$.

2. The desalination battery of claim 1, wherein the interlayer spacing between the plurality of graphene layers is significantly uniform.

3. The desalination battery of claim 1, wherein the interlayer spacing is between about 0.37 nm and 0.45 nm.

4. The desalination battery of claim 1, wherein the power source is configured to operate between about −0.5 to 1.5 V.

5. The desalination battery of claim 1, wherein the battery further comprises a saline water inlet and a fresh water outlet.

6. The desalination battery of claim 1, wherein both the first and second intercalation hosts comprise expanded graphite having a plurality of graphene layers with an interlayer spacing greater than 0.34 nm.

7. The desalination battery of claim 1, wherein the second intercalation host includes alkali metal oxide(s).

8. The desalination battery of claim 1, wherein at least the first intercalation host includes about 60 to 95 wt. % expanded graphite, about 1 to 20 wt. % conductivity agent(s), and about 1 to 20 wt. % polymeric binder(s), based on the total weight of the first intercalation host.

9. The desalination intercalation electrode of claim 1, wherein the polymeric binder(s) include polyvinylidene fluoride.

10. The desalination intercalation electrode of claim 1, wherein the conductivity agent(s) include carbon black.

11. A desalination intercalation electrode for use with a desalination battery, the electrode comprising:
    about 60 to 95 wt. % expanded graphite;
    about 1 to 20 wt. % conductivity agent(s); and
    about 1 to 20 wt. % polymeric binder(s), based on the total weight of the desalination intercalation electrode.

12. The desalination intercalation electrode of claim 11, wherein the expanded graphite includes a plurality of graphene layers with an interlayer spacing between the graphene layers in z-direction greater than 0.34 nm.

13. The desalination intercalation electrode of claim 12, wherein the interlayer spacing between the plurality of graphene layers is significantly uniform.

14. The desalination intercalation electrode of claim 12, wherein the interlayer spacing is greater than 0.34 nm.

15. A desalination intercalation host comprising:
    expanded graphite including a plurality of graphene layers with an interlayer spacing $d_s$ between the graphene layers in z-direction greater than 0.34 nm;
    one or more pillaring agents, each incorporated between adjacent graphene layers within the expanded graphite and configured to maintain the interlayer spacing ds between the adjacent layers;
    one or more conductivity agents; and
    one or more polymeric binders.

16. The desalination intercalation host of claim 15, wherein the one or more pillaring agents include sulfur.

17. The desalination intercalation electrode of claim 15, wherein the one or more pillaring agents include one or more metal oxides.

18. The desalination intercalation electrode of claim 15, wherein the one or more pillaring agents include one or more oxygen functional groups.

19. The desalination intercalation electrode of claim 15, wherein the interlayer spacing ds is between about 0.37 nm and 0.45 nm.

20. The desalination intercalation electrode of claim 15, wherein the one or more pillaring agents are chemically bonded to the graphene layers.

* * * * *